(12) United States Patent
Shoenfeld

(10) Patent No.: US 6,364,505 B1
(45) Date of Patent: Apr. 2, 2002

(54) ILLUMINATOR HAVING BRIGHTNESS COMPENSATION

(75) Inventor: Norman A. Shoenfeld, Livingston, NJ (US)

(73) Assignee: S & S X-Ray Products, Inc., Brooklyn, NY (US)

( * ) Notice: Subject to any disclaimer, the term of this patent is extended or adjusted under 35 U.S.C. 154(b) by 0 days.

(21) Appl. No.: 09/617,642

(22) Filed: Jul. 17, 2000

(51) Int. Cl.⁷ ................................................. F21V 1/00
(52) U.S. Cl. ..................... 362/241; 362/242; 362/297; 362/260; 362/97; 362/247; 362/225; 362/234
(58) Field of Search .................................. 362/241, 242, 362/297, 260, 234, 97, 225, 247

(56) References Cited

U.S. PATENT DOCUMENTS

| | | | |
|---|---|---|---|
| 4,335,421 A | * 6/1982 | Modia et al. ................ | 362/223 |
| 4,691,267 A | 9/1987 | Giesberg .................... | 62/218 |
| 5,826,973 A | * 10/1998 | Melzian ..................... | 362/297 |
| 5,856,864 A | 1/1999 | Gulick, Jr. et al. .......... | 355/71 |
| 5,892,621 A | * 4/1999 | Mcgroger et al. .......... | 359/599 |

* cited by examiner

Primary Examiner—Thomas M. Sember
Assistant Examiner—Ali Alavi
(74) Attorney, Agent, or Firm—Bernhard P. Molldrem, Jr.

(57) ABSTRACT

An x-ray illuminator achieves uniform illumination intensity across the front glass diffuser screen. The reflectance of the reflector is varied over its surface, the transmissivity of the screen can be varied over its extent, or both. The internal reflector can have a reflectance that is reduced at positions directly behind centers of the fluorescent tubes and which gradually increases to maximum reflectance at positions at ends of the tubes and at positions away from centerlines of the tubes.

7 Claims, 2 Drawing Sheets

ILLUMINATOR HAVING BRIGHTNESS COMPENSATION

BACKGROUND OF THE INVENTION

This invention relates to an illuminator suited for radiology use, and is especially directed to a illuminators and light boxes for viewing radiographs (x-rays) or for viewing photographic negatives or transparencies. The invention is more specifically concerned with an x-ray illuminator that provides even lighting over its surface without bright or dark areas to facilitate film-based studies by radiologists or other professionals.

At present, where the radiologist is working with traditional film images a lighted illuminator is required, which typically is a light box having lamps contained inside it and a flat glass diffuser or screen on the front face for back lighting the radiographs. Illuminators are frequently used in hospitals and clinics for analysis and study of a patient's internal tissues.

Where soft tissues are involved, an extremely even lighting is required. However, in a traditional back-lighted unit there is considerable variance in light intensity over the area of the diffuser screen, depending on the relative position of the bulb or tube behind it. Where soft tissues are the subject of the radiograph, even a small variation in illumination intensity can mask rather faint details in the images. For certain applications, these variations can obscure changes from one image to another, such as x-rays taken of the same patient at two different times.

The typical illuminator is generally in the form of a light box, containing a number of fluorescent tubes, and a glass plate on the front wall serving as diffuser screen. A reflector, usually in the form of a metal sheet coated with high-reflectance white paint, is positioned behind the tubes. There are also ballasts and other electrical drive elements inside the light box for providing the appropriate electric power to the tubes. Because the tubes are individual light emitters, the light emanating through the front diffuser screen tends to be more concentrated at the tube positions. Also, even the most carefully engineered fluorescent tubes tend to be measurably brighter at the center of the tube than near the ends, and so the illumination likewise varies from bright to dim between screen positions over the center and ends of the tubes.

The current international standards for x-ray illuminators, which have been proposed for the United States, include the need for uniformity of light output across the entire viewing surface of the front diffuser screen. There are also certain minimum light output standards established in this country for mammography illuminators. The illuminator industry has faced a problem in attaining these two goals with existing fluorescent tubes, as these tubes exhibit a high degree of non-uniformity over the length of the lamp. For instance, a standard 4-foot-long or 5-four-long fluorescent tube may have a center portion that is 50% brighter or more than the regions near the two ends of the same tube. However, uniformity of light output is necessary in comparing radiograph findings within regions of the same radiograph image, and also when comparing current film records with older sequential studies. Even, uniform light output across the illuminator aids in delineation of significant findings which could potentially be masked by non-uniformities in the illumination.

The industry is aware of this problem, and there have been several attempts made at correcting non-uniformity of light distribution.

One prior attempt has involved using an array of smaller, i.e., 18-inch, bulbs or tubes aligned vertically, rather than having a smaller number of long tubes arranged horizontally. These usually require the array to be linear, although a hatched or herringbone pattern is possible. Neon bulbs can be included at certain places in the grid to try to improve uniformity. However, it has been found that the light output from the array of smaller tubes cannot match the light output that can be attained by using the larger tubes. Other factors also disturb the attempts to obtain uniformity. There can be light output variation of 10% or more between fluorescent tubes, even when coming from the same manufacturing batch. There can also be variances from ballasts, even if the ballasts are considered "matching," and from paint variations in different reflector sections. In addition, the shorter fluorescent tubes have been found to have reduced lamp life as compared with longer tubes.

Prior attempts have been made to improve the reflector to better distribute the light around both ends of the tubes, that is, to try to direct more light into these "dead" areas. These reflectors can be designed in a parabolic curve or a shape simulating a parabolic curve over the lengthwise direction, with the bulb centered longitudinally across it, in an attempt to distribute more light into the area between bulbs. Additional angled reflectors may be used, usually with only limited success, in an attempt to bolster light output at the tube-end portions of the illuminator, i.e., at the "dead" areas.

Other attempt have included increasing the box depth to increase light diffusion. Again this has had only limited success, and the larger box size also creates additional inconvenience.

OBJECTS AND SUMMARY OF THE INVENTION

Accordingly, it is an object of the present invention to provide an x-ray illuminator that avoids the drawbacks of the prior art.

It is another object to provide an illuminator that compensates for any unevenness in illumination due to the lamps and reflectors, to permit more reliable analysis of radiographic images.

It is a further object to provide an illuminator that attains even illumination without the need for additional lamps or additional reflectors.

In accordance with an aspect of the present invention, an x-ray illuminator comprises a housing having a front side; a plurality of fluorescent tubes or the equivalent within the housing; an internal reflector situated behind the fluorescent tubes for directing light from the tubes towards the front side of the housing; a transparent diffuser plate at the front side of the housing on which radiographs or transparencies are placed for viewing; and circuitry for driving the fluorescent tubes. To obtain uniform illumination the reflectance of the reflector can be varied over its surface, the transmissivity of the screen can be varied over its extent, or both. For example, the internal reflector can have a reflectance that is reduced at positions directly behind centers of the fluorescent tubes and which gradually increases to maximum reflectance at positions at ends of the tubes and at positions away from centerlines of the tubes. Alternatively, the diffuser plate has a transmissivity that is reduced at a position directly in front of the centers of said fluorescent tubes and gradually increases to a maximum transmissivity at positions towards the ends of. the tubes and at positions away from the centerlines of the tubes.

Correction of non-uniformity of light output can be carried out by using the following procedure: a. Surveying the light output of the viewing surface at multiple points; b.

From the survey, creating a "topographical" map of light output for the entire viewing surface, with contour lines of equal luminance being displayed; and c. From this topographical map of light output, designing a reflector or absorber which is painted with a gradient of increasingly absorptive paint at regions of increased light output. This generally means there is a higher concentration of photoabsorbent of dark pigments in the center, and progressively lower concentrations of dark pigments towards the ends of the fluorescent tubes and other reduced-output regions. This is generally the opposite of what is currently done, where the reflector is coated throughout with as reflective a medium as possible. In contrast to the prior art, the technique of this invention intentionally reduces light output in the brightest areas of the illuminator to equal that of the areas of lowest illumination.

The result of this process is a reflector and/or absorber designed to be highly reflective in the regions of decreased light output so as to augment light output in these areas, but to be less reflective in the regions of the center portion of the bulb to reduce the light output in the bright regions. Using this technique, uniformity is achieved using presently existing non-uniform lamp tubes, and without having to include additional reflectors or other hardware.

Recently, there has arisen a need for increased light output for X-ray illuminators, for example, for interpreting the fine changes on dense images, such as mammographs. At the same time, it is desired to reduce the need for supplemental X-ray studies and to minimize the patients' exposure to X-rays. The standard 18-inch lamps and magnetic ballast combinations can barely meet the current FDA requirement for light output for mammography illuminators. For that reason, fluorescent tubes of much higher output are required. The larger tubes can meet the high illumination requirements, but their non-uniformity is much more pronounced. However, the excellent light output obtainable with these tubes makes it possible to take the approach of the present invention, whereby light output can be deliberately decreased in some areas to achieve uniformity.

In this invention, a specialized reflector/absorber system can be used that is designed to reduce light output in the center, where light output is at its maximum, but gradually increase in reflectance towards the tube ends and also towards positions away from the axes of the tubes. The reflector/absorber can be designed based on the topographical map obtained in a survey of the output (using a standard reflector and diffuser screen). Then a less reflective paint, i.e., paint achieving a gradient of reflectivity, is applied on the reflector to make the output more uniform, so the reflector is more reflective at the ends, and less reflective at the center.

The above and many other objects, features, and advantages of this invention will become apparent from the ensuing description of a selected preferred embodiment, which is to be considered in connection with the accompanying Drawing.

DETAILED DESCRIPTION OF THE PREFERRED EMBODIMENT

Figure 1:
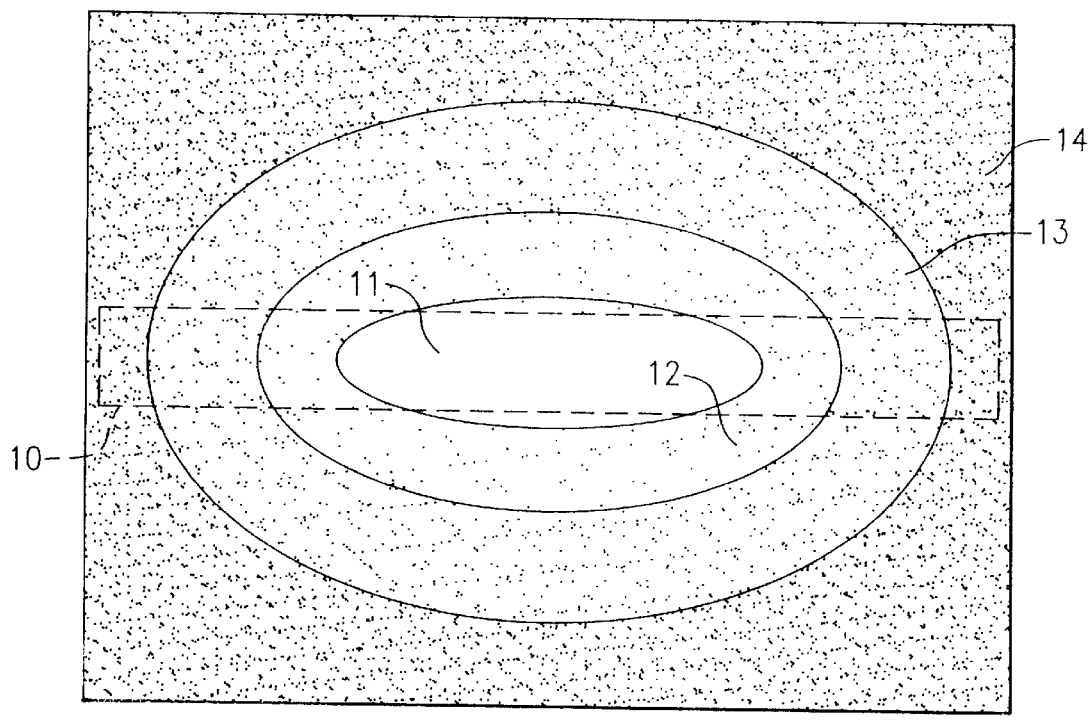
FIG. 1 is a topographic map of light intensity for a fluorescent tube over a portion of an illuminator viewing surface.

With reference to the Drawing, FIG. 1 illustrates a topographical map of the illumination output intensity for an illuminator, here for the sake of simplicity, showing the output for a single fluorescent tube 10 (illustrated in ghost lines). This is obtained by taking a survey over the entire height and width of the front illuminator diffuser screen, and then plotting the shapes of contour lines of equal intensity. Here, for sake of simplicity, there are three contour lines shown, dividing the area into a central zone 11 of maximum intensity, and surrounding zones 12, 13, of gradually reduced intensity, and finally an outer zone 14 of lowest intensity. The zone 11 of highest intensity is somewhat oval in shape and centered on the tube axis over the mid-portion of the tube 10. The intensity is lowest at the ends of the tube 10 and at the areas farthest from the axis of the tube, i.e., in zone 14. In a practical embodiment, there could be many more contour lines, and a more gradual delineation of the light output intensity.

Figure 2:
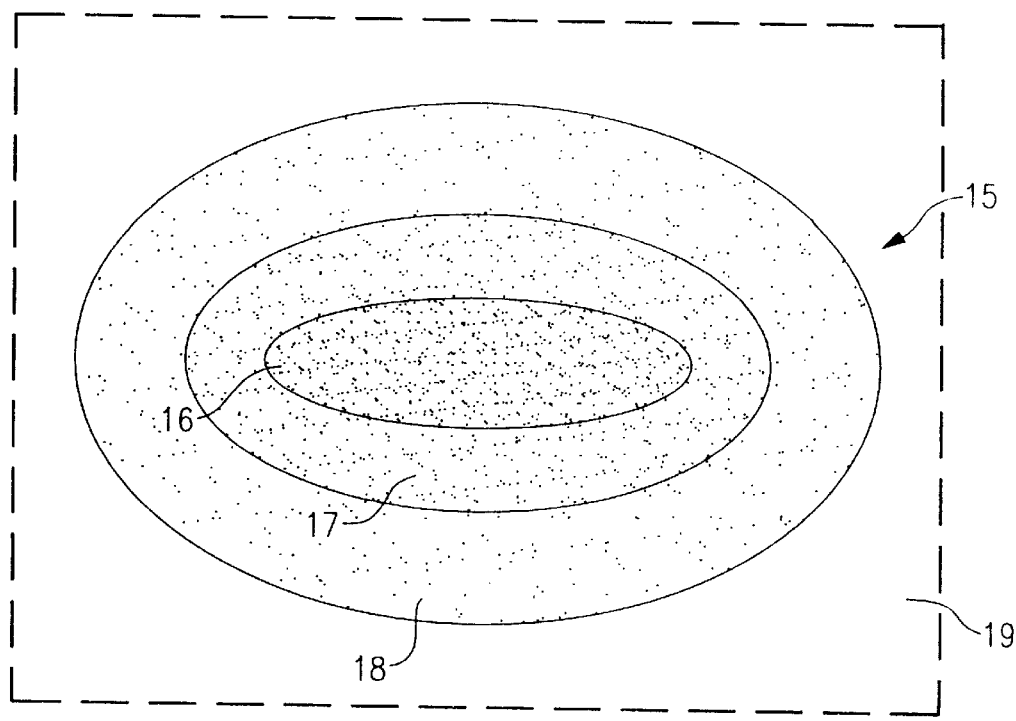
FIG. 2 is a map of reflector or absorber gradient design based on the topographic map of FIG. 3 is a sectional side view of a radiographic illuminator of an embodiment of this invention.

Once the topographical map of FIG. 1 has been created, then a corresponding absorption pattern 15 can be created, as shown in FIG. 2. This pattern 15 constitutes a gradient design based on the light output intensity pattern, and has a zone of maximum absorption 16 that corresponds to the center of the lamp tube 10, and then successive surrounding zones 17 and 18 of lesser absorption, and an area of minimal absorption 19, that is, maximum reflectance in the case of a reflector. Again, in a practical embodiment, there could be more than the number of zones shown here, and the absorptive material on the reflector would have a more continuous gradient from the center outwards. However, FIGS. 1 and 2 are shown with only the four zones here to simplify the discussion. It is possible for a reflector/absorber to have as few as two zones.

Figure 3:
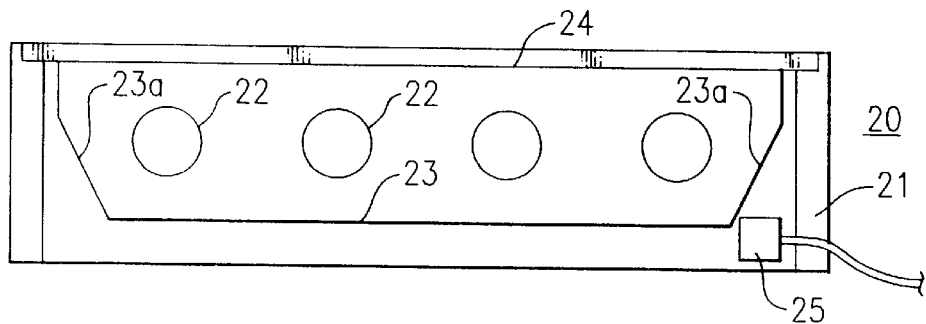

An illuminator 20 which can incorporate the improvements of this invention is shown in FIG. 3. Here, the illuminator comprises a housing 21 with four fluorescent lamps or tubes 22 arranged parallel to each other. Here, the tubes 22 are of a high-luminance or high intensity design. There is a flat reflector 23 disposed behind the lamps 22, with angled sides 23a outside the first and fourth ones of the lamps 22. This reflector 23 is coated with a reflective paint, with a high a reflectivity as possible, except for portions that are treated to compensate for light intensity variations, as discussed further. A front diffuser 24 is mounted in an open front of the housing 21 over the lamps 22, and can be formed of a glass plate that is etched or frosted, or Plexiglas. Electrical drive equipment 25 (i.e., ballasts) for supplying the appropriate electrical power to the lamps is disposed within the housing, here shown behind one of the angled wall portions 23a of the reflector.

Figure 4:
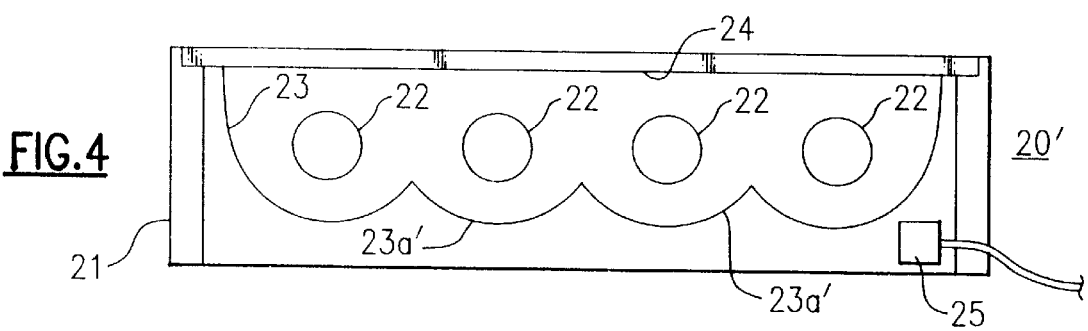
FIG. 4 is a sectional side view of an illuminator according to an alternative construction.
Figure 5:
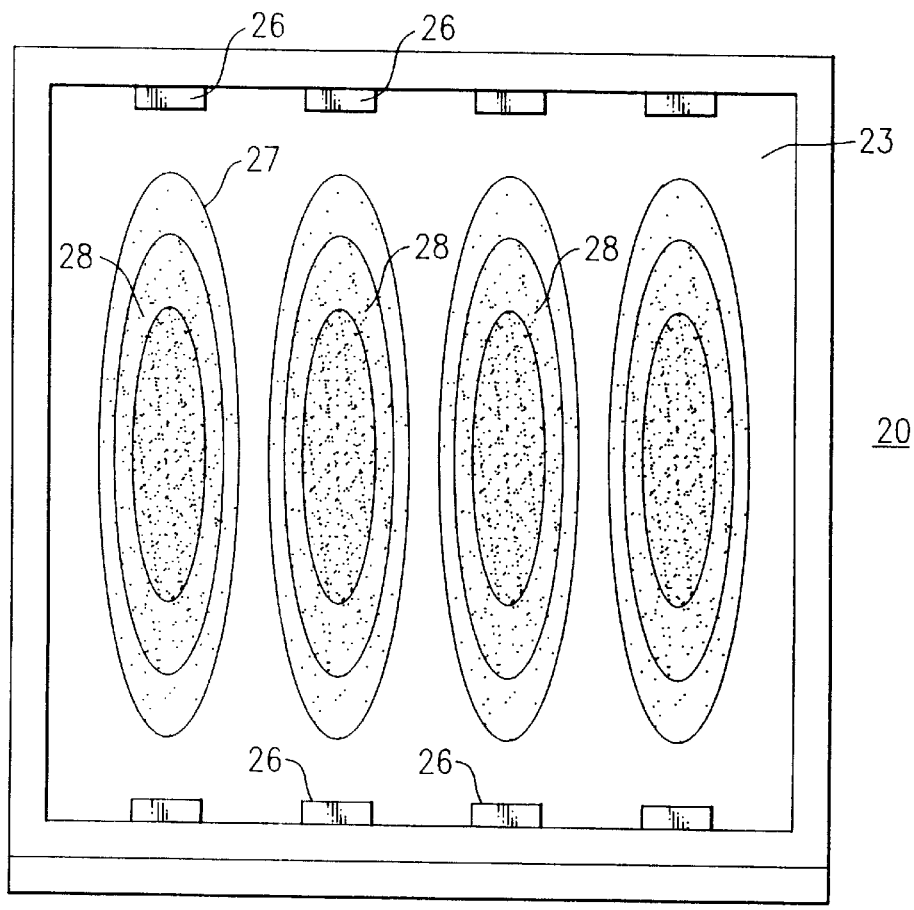
FIG. 5 is a front plan view of the illuminator with diffuser screen removed showing the reflector adapted according to an embodiment of this invention.

FIG. 4 shows another illuminator 20' according to an alternative embodiment. Here, elements of the illuminator that are identical with the illuminator 20 of FIG. 3 are identified with the same reference numbers and a discussion thereof will not be repeated. However, in this embodiment the reflector 23' has a parabolic or somewhat parabolic profile, with parabolic shaped sections 23a' for each of the four lamps 22. Shaped reflectors such as these may help to overcome some of the unevenness of illumination.

A top plan view of the illuminator 20 of FIG. 3 is shown in FIG. 4, with the front diffuser plate and the fluorescent tubes having been removed to exhibit the reflectivity (or absorption) pattern on the reflector 23. Sockets 26 for the fluorescent tubes 22 are illustrated here, and define the positions of the tubes 22 when they are in place. Here, the reflector is generally coated with a highly reflective white, but a pattern 27 of an absorptive medium is shown, with generally oval portions 28 centered on the position of each lamp. Each portion of the pattern is concentrated at a location corresponding to the center and axis of each lamp, and becoming gradually less absorptive towards the two ends of each lamp, i.e., towards the lamp sockets 26, and also becoming more reflective, or less absorptive, at positions between the positions of the tubes 22.

While not shown here, the illuminator can also include an x-ray holder, which is disposed along an upper or top side of the illuminator 20, for holding the radiographs against the screen 24. Also, means can be provided on the back side of the housing 21 for attaching or hanging the illuminator on a wall.

The reflectors for all the illuminators of a single design can be painted with the same pattern. It is recommended that when the fluorescent lamps are installed, both initially and later to replace a failed tube, that all four tubes 22 be replaced at the same time, with tubes from the same batch or lot. These can be pre-tested to obtain a set of lamps of more-or-less matched intensity.

Also, while the invention has been described in terms of a fluorescent tube illuminator, the invention should not be limited to that but could be used with other types of lamps being the source of illumination. In each case a survey of the pattern of illumination intensity would be used to create a compensating pattern of reflectivity behind the lamps.

While the invention has been described hereinabove with reference to a preferred embodiment, it should be recognized that the invention is not limited to that precise embodiment. Rather, many modification and variations would present themselves to persons skilled in the art without departing from the scope and spirit of this invention, as defined in the appended claims.

I claim:

1. Illuminator for viewing radiographs or photographic transparencies, comprising a housing having a front side; a plurality of fluorescent tubes within said housing; an internal reflector situated behind said fluorescent tubes for directing light from the tubes towards the front side of the housing; a transparent diffuser plate at the front side of the housing on which said radiographs or transparencies are placed for viewing; and circuitry for driving said fluorescent tubes; wherein said internal reflector is coated with a reflective coating that has a gradient of increasing absorption of light such that said reflector has a reflectance that is reduced at positions directly behind centers of said fluorescent tubes and gradually increases to maximum reflectance at positions at ends of said tubes and at positions away from centerlines of the tubes.

2. Illuminator according to claim 1 wherein said reflector is covered with a reflective coating in which there are darker pigments, with areas of reduced reflectance containing a relatively high concentration of said darker pigments centered on said tubes.

3. Illuminator for viewing radiographs or photographic transparencies, comprising a housing having a front side; a plurality of fluorescent tubes within said housing; an internal reflector situated behind said fluorescent tubes for directing light from the tubes towards the front side of the housing; a transparent diffuser plate at the front side of the housing on which said radiographs or transparencies are placed for viewing; and circuitry for driving said fluorescent tubes; wherein said internal reflector has a reflectance that is reduced at positions directly behind centers of said fluorescent tubes and gradually increases to maximum reflectance at positions at ends of said tubes and at positions away from centerline of the tubes; wherein said reflector is covered with a reflective coating in which there are darker pigments, with areas of reduced reflectance containing a relatively high concentration of said darker pigments centered on said tubes; and wherein said areas of reduced reflectance are generally oval in shape.

4. Illuminator for viewing radiographs or photographic transparencies, comprising a housing having a front side; a plurality of lamps within said housing; an internal reflector situated behind said lamps for directing light from the lamps towards the front side of the housing; a transparent diffuser plate at the front side of the housing on which said radiographs or transparencies are placed for viewing; and circuitry for driving said lamps; wherein said internal reflector is coated with a reflective coating that has a gradient of increasing absorption of light such that the reflector has a reflectance that is reduced at positions directly behind centers of said lamps and gradually increases to maximum reflectance at positions away from centers of the lamps.

5. Method of producing an illuminator that has a housing having a front side, a plurality of fluorescent tubes within said housing; an internal reflector situated behind said fluorescent tubes for directing light from the tubes towards the front side of the housing; a transparent diffuser plate at the front side of the housing on which said radiographs or transparencies are placed for viewing; and circuitry for driving said fluorescent tubes; with an illumination through the front side diffuser plate that is substantially uniform over its length and width; the method comprising surveying the illuminance of the illuminator at a multiplicity of points on the front diffuser plate; mapping areas of equal illuminance for the front diffuser plate based on the surveyed illuminance at said multiplicity of points; coating said reflector with a photo-absorbent material which has a gradient of reflectance over said reflector to create areas of photoabsortion in accordance with said mapping, such that the reflector has an increased light absorption at the points corresponding to the surveyed points of highest illuminance and smallest absorption at the points of lowest illuminance.

6. The method of claim 5, wherein said surveying includes surveying said illuminance over the entire height and width of said front diffuser plate, and said mapping includes plotting contour lines of equal light intensity.

7. The method of claim 5 wherein said mapping includes dividing the area of said front illuminator plate into oval shaped zones.

* * * * *